Feb. 10, 1948.  P. C. CLARKE  2,435,772
METHOD AND APPARATUS FOR TESTING WIRE
Filed Aug. 16, 1944
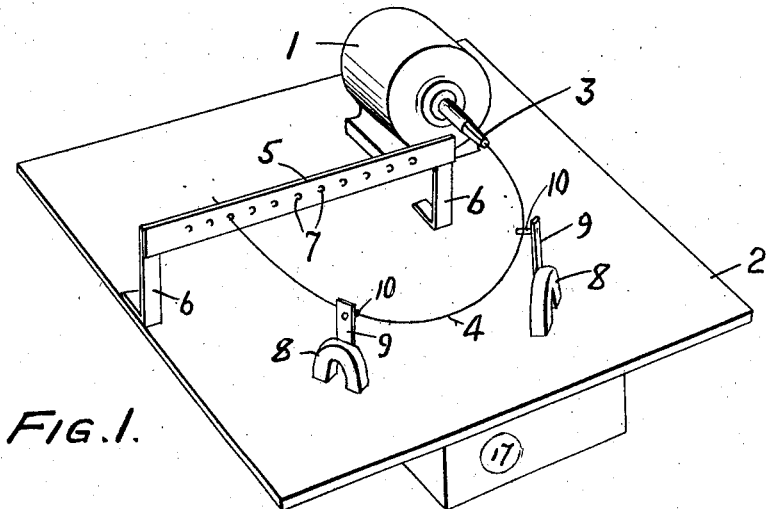
FIG.1.
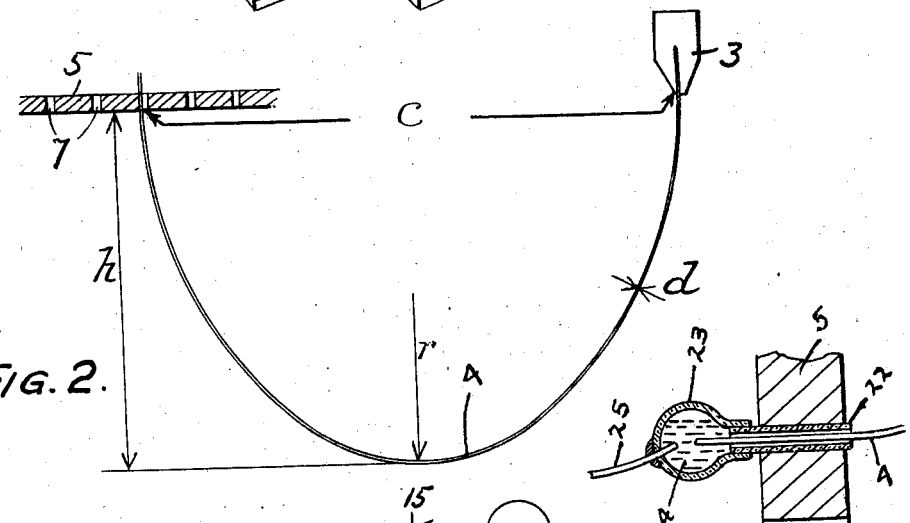
FIG.2.
FIG.4.
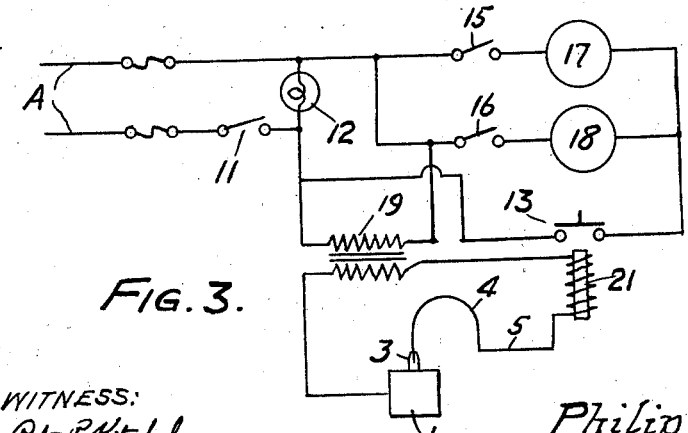
FIG.3.
WITNESS:
Robt R Mitchel.
INVENTOR
Philip C. Clarke
BY
Bunn & Harding
ATTORNEYS.

Patented Feb. 10, 1948

2,435,772

UNITED STATES PATENT OFFICE 2,435,772

METHOD AND APPARATUS FOR TESTING WIRE

Philip C. Clarke, Line Lexington, Pa., assignor to Hunter Pressed Steel Company, Lansdale, Pa., a corporation of Pennsylvania Application August 16, 1944, Serial No. 549,741

4 Claims. (Cl. 73—100)

This invention relates to a method and apparatus for testing wire and, more particularly, relates to method and apparatus for subjecting wire to a rotating beam fatigue test.

The method according to this invention will be found to be highly accurate, and, at the same time, will enable wire to be fatigue tested with simplicity and rapidity.

The apparatus according to this invention is simple in construction and readily set up and operated for the carrying out of the method for the testing of wire of a wide range of diameters.

Generally speaking, the method and apparatus according to this invention will be found most adaptable for the ready and accurate fatigue testing of small diameter wire, as, for example, wire of a diameter within say about the range 0.001-0.1 inch, though, as will appear, wire of a diameter in excess of 0.1 inch may be readily tested where sufficient space is available.

Having now indicated, in a general way, the nature and purpose of the method and apparatus according to this invention, I will proceed to a detailed description thereof with reference to the accompanying drawing in which:

Figure 1 is a perspective view showing the essential elements of a simple form of apparatus according to this invention.

Figure 2 is a diagrammatic view illustrating the set-up of wire to be tested according to the method of this invention.

Figure 3 illustrates an electrical circuit adapted for embodiment in the apparatus shown in Figure 1.

Figure 4 is a view, partly in section, showing a detail of construction.

Referring now more particularly to Figures 1 and 3, an A. C. or D. C. motor 1 is mounted on a table 2, or other suitable support. Mounted on the motor shaft is a chuck 3 adapted to grip an end portion of a wire 4 to be tested.

Adjacent to the motor 1 and extending at right angles to the axis of the motor shaft, is a rectangular metal bar 5. The bar 5 is supported from the table 2 by means of brackets 6, and the bar is provided with a series of drilled holes 7, 7 for the reception of an end portion of the wire 4. The holes 7, 7 are spaced above the surface of table 2 at the same distance as is the chuck 3.

The holes 7, 7 in bar 5 are spaced from the chuck at distances such that the end portions of a wire of given diameter to be tested will be bent around to a particular form, as will be hereinafter described for testing according to the method of this invention.

The wire 4 will be supported intermediate its ends and such may be conveniently accomplished by forming the top of table 2 of steel and providing magnets 8, 8, each carrying a member 9, which in turn carries a laterally extending pin 10. The magnet may be magnetically engaged with the steel top of table 2 at desired points for the support of the wire on the laterally extending pins 10, which will be arranged to support the wire in parallelism with the surface of table 2.

As will now be appreciated, when the motor 1 is operated the wire 4 will be rotated about its axis and, being stressed in the form in which it is supported, will ultimately break if the maximum bending stress on the wire is in excess of the endurance limit of the material of the wire. In order to determine the number of rotations of the wire required to break it and the period of time during which it is rotated, the circuit shown in Figure 3 may be conveniently used.

In Figure 3 a circuit A carrying, for example, an alternating current of 60 cycles, from any convenient source, is connected through an indicator lamp 12 and a transformer 19. For control of the circuit through the transformer and lamp a manually operated switch 11 is provided. The circuit A is also connected to an electric clock 17 and the winding 18 of motor 1 through relay contacts 13. Switches 15 and 16 are provided for independent control of the clock and motor.

A current of low value is set up by the transformer in a circuit including the wire 4 and relay coil 21.

As will now be obvious, on the closing of switch 11, by virtue of the current set up by the transformer in the circuit including the relay coil 21, the contacts 13 will be closed and if the switches 15 and 16 be closed the clock and motor will be operated. Operation of the motor will effect rotation of the wire 4 and the clock will serve to measure the period during which the wire is rotated, from which, given the R. P. M. of the motor the total number of turns of the wire can be calculated.

When the wire breaks the circuit including the relay coil 21 will be broken and the relay contacts 13 will open, with the result that the motor and clock will stop.

By virtue of the provision of switches 15 and 16 the motor and clock may be controlled independently when relay contacts are closed by the setting up of a current in the circuit including the relay coil 21 and the wire 4. Thus, when the relay contacts are closed, the clock can be operated for setting without operation of the motor and rotation of the wire 4 and likewise, where desired, the motor can be operated without operation of the clock.

Since the current set up in the circuit including wire 4, will be of low value, in order to obtain good contact with the bar 5, the holes 7 therein may desirably be provided, as shown in Figure 4, with bushings 22, preferably of glass, opening at the rear of the bar 5 into a cup 23 containing mercury 24, into the end of which wire 4 penetrates and from which a lead 25 extends for connecting the wire into the circuit. The bushing 22 will be of an inside diameter somewhat larger than the wire, but the clearance will be such as not to permit any substantial amount of mercury to pass from the cup 23.

According to the method of this invention, for the carrying out of which the above described apparatus is adaptable, a length of wire of given diameter will be rotated, as in the rotating beam fatigue test, in a looped form, and having its ends supported at points where the bending movement of the loop becomes zero, leaving only a lateral force acting horizontally between the points of support, and hence with the maximum stress, which may be in excess of the endurance limit of the material of the wire, at the point of minimum radius of curvature of the loop.

In order to obtain this condition, it has been found that a certain constant relationship exists between the vertical distance from the plane of the points of support of the ends of the wire and the height of the loop, i. e., the distance $h$, Figure 2, and the horizontal distance between the points of end support, i. e., the distance C, Figure 2. As a consequence, given the diameter of a wire and the bending stress under which it is to be tested, according to this invention the requisite distances C and $h$, the required length of wire, the minimum radius of curvature and the lateral force at the points of end support of the loop can readily be obtained by application of the following formulae. Thus:

$C = 1.198 \dfrac{Ed}{s}$ $h = 0.835\ C$ $L = 2.19\ C = 2.82 \dfrac{Ed}{s}$

Where $E$ = Young's modulus
$R_{min} = 0.417\ C$
$P = 0.141 \dfrac{Ed^4}{C^2}$
$d$ = Diameter of wire
$C$ = Distance between points of support of loop
$h$ = Height of loop
$L$ = Length of wire between points of end support
$R_{min}$ = Minimum radius of curvature
$P$ = Bushing load or lateral force at the chuck
$s$ = Bending stress under which wire is to be tested Having determined the distances C and $h$, Figure 2, for the formation of a loop of proper form for wire of a plurality of diameters under different stresses, the apparatus above described may be constructed for the test of wire under different stress settings by locating the holes 7, 7 respectively in the bar 5 at the different distances from the center line of the chuck 3, the holes respectively being large enough to receive wire of a range of diameters.

For the test of a wire of any given diameter, the necessary length for the formation of the requisite loop is determined by the above formulae, additional length being allowed for entry into the chuck and properly spaced hole 7 in bar 5.

The testing of any given wire set up according to this invention is then carried out by rotating it until it breaks, as in the usual rotating beam fatigue test, it being noted that the support afforded to the loop by the pins 10 suppresses vibration, hence submersion in an oil bath is unnecessary. And it will be further noted that the holes 7, 7 in bar 5 need not accurately fit the wire so that if desired one hole size may be used with a range of wire diameters.

Generally speaking, a given wire under test will break at the point of minimum radius of curvature where the stresses will be at maximum. However, by calculation convenient evaluation of an off-center break is shown in the following table:

| Location of break per cent off center | 2½ | 5 | 7½ | 10 | 12½ | 15 | 17½ | 20 | 22½ | 25 |
|---|---|---|---|---|---|---|---|---|---|---|
| Stress per cent of max | 99.6 | 98.3 | 96.2 | 93.3 | 89.8 | 85.6 | 80.9 | 75.7 | 70.2 | 64.4 |

The method and apparatus according to this invention will be found to enable the necessary data to be obtained in a short time, and especially at the high stresses at which spring wire is usually tested.

What I claim and desire to protect by Letters Patent is:

1. The method of rotating beam fatigue testing wire which includes supporting at opposite points a loop of wire with the ends of the wire extending from the loop parallel to each other and of a form such that the distance between the points of support of the loop will equal $$1.198 \dfrac{Ed}{s}$$

where E is Young's modulus, $d$ is the diameter of the wire and $s$ is a bending stress in excess of the endurance limit of the material of the wire under which the wire is to be tested and such that the height of the loop is equal to 0.835 times the distance between the points of support of the loop and rotating the wire until it breaks.

2. An apparatus for subjecting a test wire of small diameter to fatigue testing, comprising a support, a chuck mounted for rotation on said support for holding one end of the wire, means for rotating said chuck, and a member on the support having a plurality of predeterminedly spaced openings therein into either of which the other end of the wire may be extended for rotation and to form a loop of predetermined size, the axes of the openings being parallel with the axis of the chuck, whereby the ends of the wires extending from the loop are maintained parallel to each other.

3. An apparatus for subjecting a test wire of small diameter to fatigue testing, which comprises a base, a pair of supports mounted on said base and provided with apertures for the reception of the ends of a loop of wire and arranged in spaced relation, the axes of the apertures in said supports being in parallelism and the wire receiving ends of said apertures being in a plane normal to the axes of the apertures, one of said supports being constructed to permit the end of the wire to be spaced at varying distances from the other end to vary the size of the loop while maintaining the two ends parallel, and means mounted on said base and coaxial with one of said support apertures for rotating the wire forming the loop.

4. The method of testing wire which includes supporting a loop of wire at opposite points with the portions of the ends of the wire extending from the loop to said points parallel to each other, whereby only a lateral force tending to spread the points of support in a substantially straight line is exerted and the bending movement of the wire is zero at the points of support and the maximum stress on the wire falls at the point of minimum radius of curvature of the loop and rotating the wire so supported until the wire in the loop portion is broken.

PHILIP C. CLARKE.

REFERENCES CITED

The following references are of record in the file of this patent:

UNITED STATES PATENTS

| Number | Name | Date |
|---|---|---|
| 2,170,640 | Kenyon | Aug. 22, 1939 |
| 2,235,622 | Ray | Mar. 18, 1941 |

FOREIGN PATENTS

| Number | Country | Date |
|---|---|---|
| 409,805 | Great Britain | May 10, 1934 |

OTHER REFERENCES

Article, "New Test for Cable Wire," page 205 of April 1936 issue, Scientific American. (A photostat copy is in class 73–100.)